(12) United States Patent
Kung (10) Patent No.: US 9,153,977 B2
(45) Date of Patent: Oct. 6, 2015

(54) BI-DIRECTIONAL SWITCHING REGULATOR AND CONTROL CIRCUIT THEREOF

(71) Applicant: Nien-Hui Kung, HsinChu (TW)

(72) Inventor: Nien-Hui Kung, HsinChu (TW)

(73) Assignee: RICHTEK TECHNOLOGY CORPORATION, Chupei, Hsinchu (TW)

( * ) Notice: Subject to any disclaimer, the term of this patent is extended or adjusted under 35 U.S.C. 154(b) by 175 days.

(21) Appl. No.: 13/958,106

(22) Filed: Aug. 2, 2013

(65) Prior Publication Data

US 2015/0035493 A1 Feb. 5, 2015

(51) Int. Cl.
*H02J 7/00* (2006.01)

(52) U.S. Cl.
CPC .................................... *H02J 7/0029* (2013.01)

(58) Field of Classification Search
USPC ......... 320/116, 118, 121, 124, 125, 128, 132, 320/134, 136
See application file for complete search history.

(56) References Cited

U.S. PATENT DOCUMENTS

| | | | | |
|---|---|---|---|---|
| 5,789,902 A * | 8/1998 | Abe et al. | ...................... | 320/134 |
| 7,923,972 B2 * | 4/2011 | So et al. | ....................... | 320/164 |
| 2004/0113585 A1 * | 6/2004 | Stanesti et al. | ................ | 320/116 |
| 2004/0160213 A1 * | 8/2004 | Stanesti et al. | ................ | 320/116 |
| 2010/0148727 A1 * | 6/2010 | Kwong et al. | ................ | 320/134 |

* cited by examiner

*Primary Examiner* — Brian Ngo
(74) *Attorney, Agent, or Firm* — Tung & Associates (57) ABSTRACT

The present invention discloses a bi-directional switching regulator and a control circuit thereof. The bi-directional switching regulator includes a power stage, an operation circuit controlling the power stage, and a power path management circuit. The power path management circuit includes a power path switch electrically connected between the output terminal and the battery, and a power path controller controlling the power path switch. The operation circuit generates the operation signal according to the output voltage or a battery voltage of the battery, and the charging current, so that: (1) a voltage difference between the output voltage and the battery voltage is ICHG*R, wherein ICHG represents the charging current and R represents a conduction resistance when the power path switch is fully conductive; or (2) the output voltage is determined by a higher one of a predetermined voltage level and the sum of ICHG*R plus the battery voltage.

14 Claims, 9 Drawing Sheets

BI-DIRECTIONAL SWITCHING REGULATOR AND CONTROL CIRCUIT THEREOF

BACKGROUND OF THE INVENTION

1. Field of Invention

The present invention relates to a bi-directional switching regulator and a control circuit of the bi-directional switching regulator; particularly, it relates to such bi-directional switching regulator and control circuit capable of effectively controlling the charging current to prevent the circuit from being crashed and the battery from being damaged.

2. Description of Related Art

Figure 1:
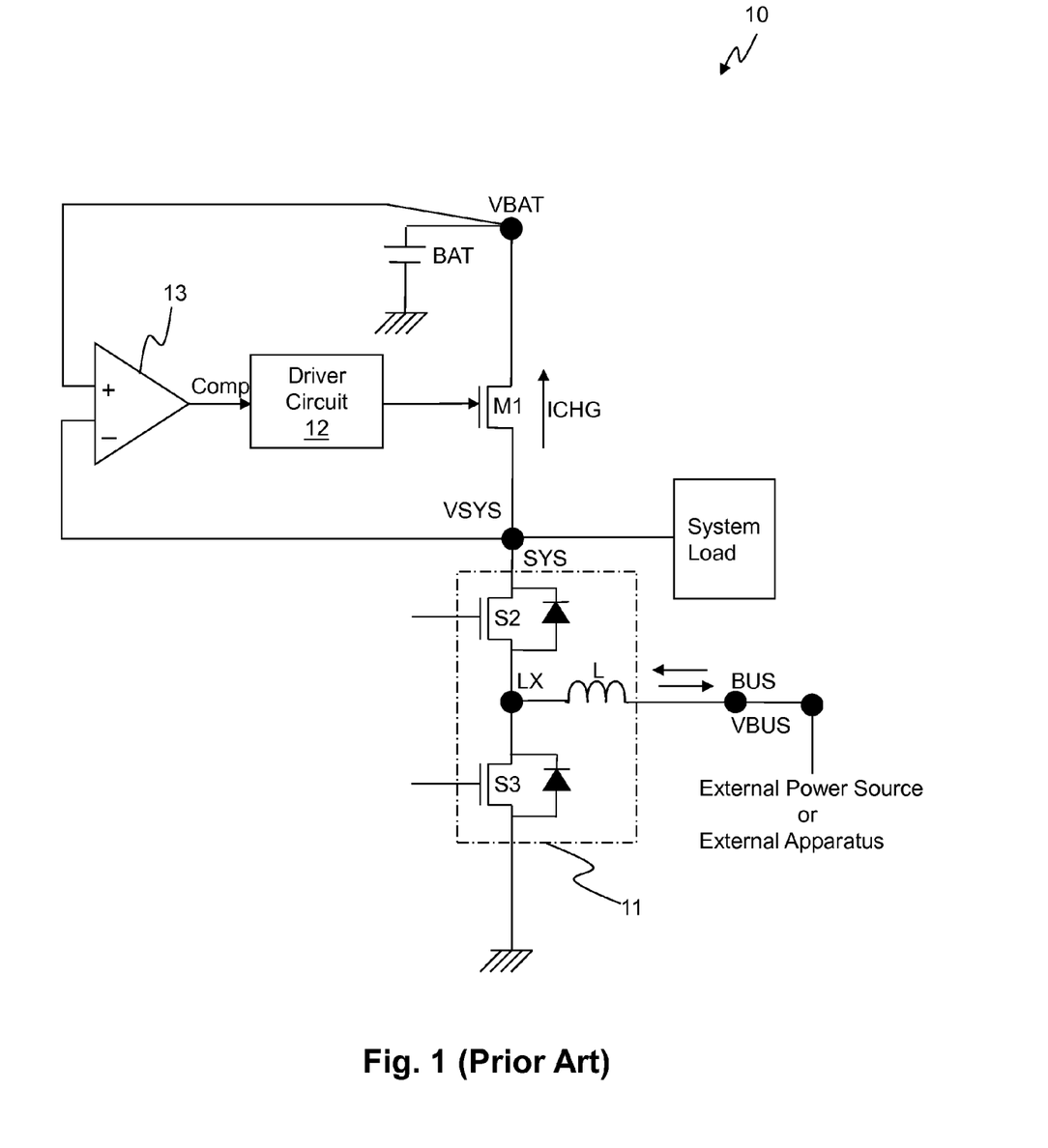
FIG. 1 shows a schematic diagram of a conventional bi-directional switching regulator.

Please refer to FIG. 1, which shows a schematic diagram of a conventional bi-directional switching regulator. The bi-directional switching regulator 10 can operate under a power supply mode (a discharging mode) or a charging mode. When the bi-directional switching regulator 10 is under the charging mode, it conducts a boost power conversion and converts an input voltage VBUS to an output voltage VSYS. That is, the bi-directional switching regulator 10 converts the lower input voltage VBUS to the higher output voltage VSYS. In this case, the input terminal BUS supplying the input voltage VBUS can be connected to an external power source. The output terminal SYS generating the output voltage VSYS can be connected to a battery and/or a system load. When the input terminal BUS is connected to an external circuit instead of an external power source, the bi-directional switching regulator becomes a buck switching regulator operating under a power supply mode. That is, the same circuit shown in FIG. 1 will operate to convert a higher battery voltage VBAT from the battery BAT to a lower input voltage VBUS through the power stage 11 and supplies power to the external circuit connected to the input terminal BUS. Generally, a current control switch will be provided between the output terminal SYS and the battery BAT.

The power stage 11 includes an upper-gate switch S2, a lower-gate switch S3 and an inductor L, all of which are connected to a common switching node LX. Under the charging mode, a current supplied from the external power source will flow toward the output terminal SYS through the inductor L and the upper-gate switch S2. This conventional bi-directional switching regulator 10 is not suitable for the application where the output terminal SYS acts as an USB port, because the charges injected by hot plug-in may damage the battery. And, if the battery voltage VBAT is too low, the level of the output voltage VSYS will also be affected, which may cause the system load to be unable to operate normally. Besides, under the circumstance where the battery BAT is not connected, if the battery terminal (the node where the battery voltage VBAT is) is short-circuited, the power stage 11 will keep operating to supply current to the battery terminal, causing serious problems to crash the bi-directional switching regulator 10 and to damage the circuit. And, if a voltage difference between the output voltage VSYS and the battery voltage VBAT is too large, there will be high power consumption; on the other hand, if there is no voltage difference between the output voltage VSYS and the battery voltage VBAT, the battery BAT cannot be charged effectively.

In view of the above, to overcome the drawbacks in the prior art, the present invention proposes a bi-directional switching regulator and a control circuit of the bi-directional switching regulator which are capable of effectively controlling the charging current to prevent the switching regulator from being crashed and the battery from being damaged.

SUMMARY OF THE INVENTION

A first objective of the present invention is to provide a bi-directional switching regulator.

A second objective of the present invention is to provide a control circuit of a bi-directional switching regulator.

To achieve the above and other objectives, from one perspective, the present invention provides a bi-directional switching regulator for use under a charging mode to convert an input voltage supplied by an input terminal to an output voltage at an output terminal, or for use under a discharging mode to supply power from the output terminal to the input terminal, the switching regulator comprising: a power stage coupled between the input terminal and the output terminal; an operation circuit for generating an operation signal to control an operation of the power stage, the operation circuit determining whether to operate under the charging mode or the discharging mode according to a mode control signal; and a power path management circuit having one end electrically connected to the output terminal and another end electrically connected to a battery, for controlling a charging operation from the output terminal to the battery, the power path management circuit including: a power path switch electrically connected between the output terminal and the battery; and a power path controller for controlling the power path switch, so that the charging current is controlled; wherein the operation circuit generates the operation signal according to information related to the output voltage or information related to a battery voltage of the battery, and information related to the charging current, so that: (1) a voltage difference between the output voltage and the battery voltage is ICHG*R, wherein ICHG represents the charging current and R represents a conduction resistance when the power path switch is fully conductive; or (2) the output voltage is determined by a higher one of a predetermined voltage level and the sum of ICHG*R plus the battery voltage.

From another perspective, the present invention provides a control circuit of a bi-directional switching regulator, for controlling a power stage under a charging mode to convert an input voltage supplied by an input terminal to an output voltage at an output terminal, or under a discharging mode to supply power from the output terminal to the input terminal, the control circuit comprising: an operation circuit for generating an operation signal to control an operation of the power stage, the operation circuit determining whether to operate under the charging mode or the discharging mode according to a mode control signal; and a power path management circuit having one end electrically connected to the output terminal and another end electrically connected to a battery, for controlling a charging operation from the output terminal to the battery, the power path management circuit including: a power path switch electrically connected between the output terminal and the battery; and a power path controller for controlling the power path switch, so that the charging current is controlled; wherein the operation circuit generates the operation signal according to information related to the output voltage or information related to a battery voltage of the battery, and information related to the charging current, so that: (1) a voltage difference between the output voltage and the battery voltage is ICHG*R, wherein ICHG represents the charging current and R represents a conduction resistance when the power path switch is fully conductive; or (2) the output voltage is determined by a higher one of a predetermined voltage level and the sum of ICHG*R plus the battery voltage.

In one embodiment, when the output voltage is determined by the predetermined voltage level and when the battery voltage is lower than the predetermined voltage level, the power path switch is turned OFF.

In one embodiment, when the power path switch is turned OFF, the bi-directional switching regulator conducts charging operation to the battery through another path.

In one embodiment, when the output voltage is determined by the predetermined voltage level and when the battery voltage is lower than the predetermined voltage level, the power path controller controls the power path switch to operate in a linear mode wherein the power path switch is a MOS transistor and operates in a linear region of the MOS transistor.

In one embodiment, the operation circuit includes: a control signal generation circuit for generating a control signal according to information related to the output voltage or information related to the battery voltage, and information related to the charging current; and a power switch control circuit for generating the operation signal according to the control signal.

In one embodiment, the control signal generation circuit includes: a first error amplifier for comparing information related to the output voltage or information related to the battery voltage with a first reference signal; and a second error amplifier for comparing information related to the charging current with a second reference signal.

In one embodiment, the control signal generation circuit includes: a first error amplifier for comparing information related to the output voltage or information related to the battery voltage with a first reference signal or information related to the predetermined voltage level; a second error amplifier for comparing information related to the charging current with a second reference signal; a comparator for judging a relationship between the output voltage and the predetermined voltage level; and a multiplexer for selecting and providing the first reference signal or information related to the predetermined voltage level to the first error amplifier according to a judgment result of the comparator.

In one embodiment, the bi-directional switching regulator further comprises: a comparator for judging a relationship between the battery voltage and the predetermined voltage level.

The objectives, technical details, features, and effects of the present invention will be better understood with regard to the detailed description of the embodiments below, with reference to the attached drawings.

DESCRIPTION OF THE PREFERRED EMBODIMENTS

The above and other technical details, features and effects of the present invention will be will be better understood with regard to the detailed description of the embodiments below, with reference to the drawings. In the description, the words relate to directions such as "upper", "lower", "left", "right", "forward", "backward", etc. are used to illustrate relative orientations in the drawings and should not be considered as limiting in any way. The drawings as referred to throughout the description of the present invention are for illustration only, to show the interrelations between the circuit and the devices, but not drawn according to actual scale.

Figure 2:
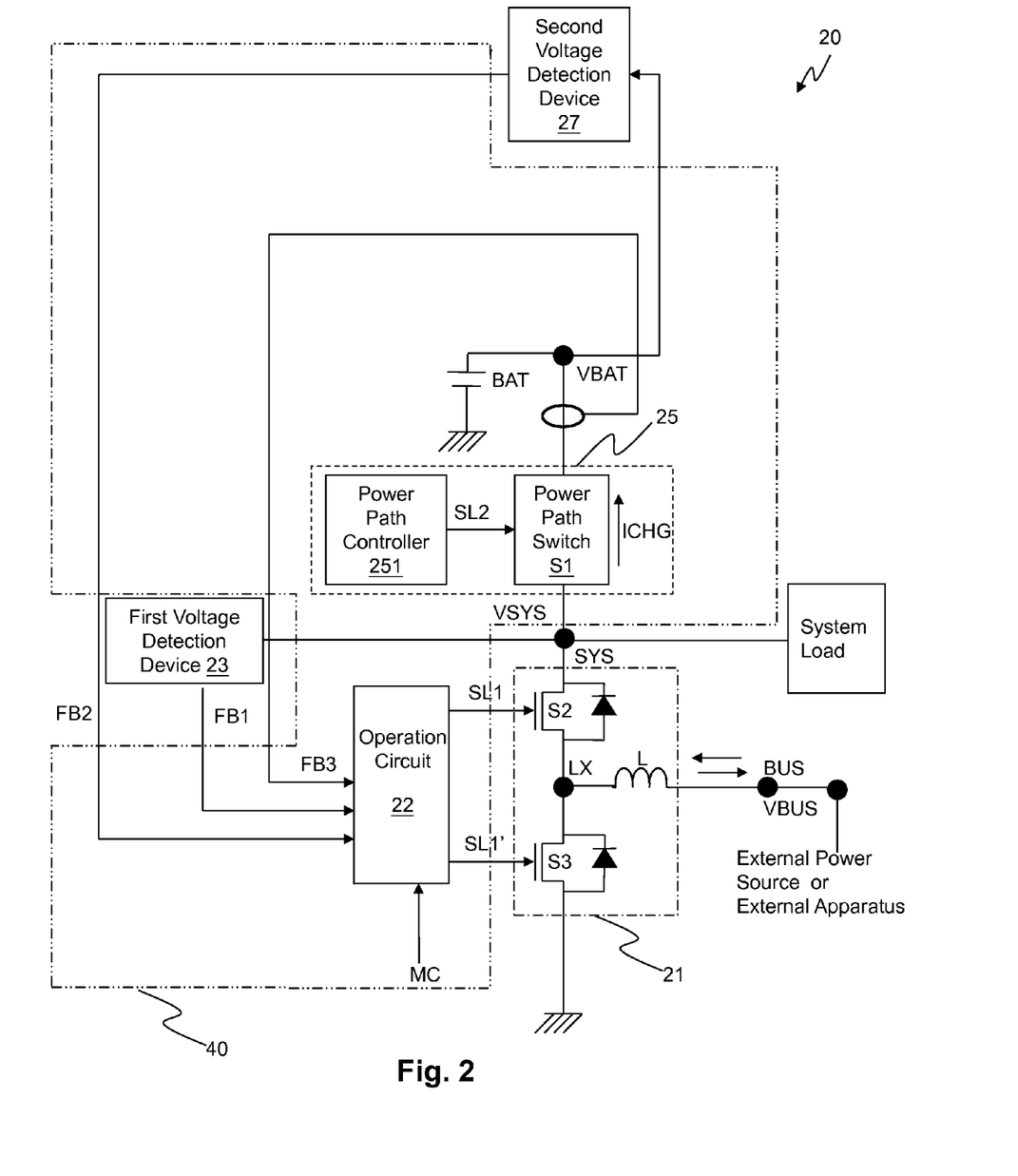
FIG. 2 shows a schematic diagram of a bi-directional switching regulator according to an embodiment of the present invention.

Please refer to FIG. 2, which shows a schematic diagram of a bi-directional switching regulator according to an embodiment of the present invention. The bi-directional switching regulator 20 can convert an input voltage VBUS supplied from an input terminal BUS to an output voltage VSYS at an output terminal SYS, or it can convert a battery voltage VBAT of a battery BAT (or the output voltage VSYS at the output terminal SYS) to the input voltage VBUS at the input terminal BUS. The input terminal BUS can be coupled to an external power source to receive power from the external power source, or it can be coupled to an external circuit to supply power to the external circuit. The bi-directional switching regulator 20 comprises a power stage 21, an operation circuit 22 and a power path management circuit 25. The power stage 21 includes an upper-gate switch S2, a lower gate switch S3 and an inductor L. The upper-gate switch S2 has one end electrically connected to the output terminal SYS and another end electrically connected to a switching node LX. The lower-gate switch S3 has one end electrically connected to the switching node LX and another end electrically connected to ground. The inductor L has one end electrically connected to the switching node LX and another end electrically connected to the input terminal BUS. The upper-gate switch S2 and the lower-gate switch S3 can be, for example but not limited to, an NMOS transistor or a PMOS transistor. The operation circuit 22 generates a first set of operation signals SL1 and SL1' to control the operations (the ON/OFF states) of the upper-gate switch S2 and the lower-gate switch S3, wherein the operation signals SL1 and SL1' can be, for example, pulse width modulation signals complementary (in inverse-phase) to each other (to avoid shoot-through due to turning ON the two switches concurrently, it can be designed that the operation signals SL1 and SL1' are substantially complementary (in inverse-phase) to each other but their OFF time periods overlap for a short period of time. The details of such "dead time" are well known to those skilled in the art, which are not redundantly described here). The operation circuit 22 generates the operation signals SL1 and SL1' according to information related to the output voltage VSYS (e.g., the output voltage VSYS itself or its divided voltage), information related to the battery voltage VBAT of the battery (e.g., the battery voltage VBAT itself or its divided voltage) and/or information related to the charging current ICHG. The details concerning how the operation circuit 22 generates the operation signals SL1 and SL1' will be discussed later. The bi-directional switching regulator 20 can optionally comprise a first voltage detection device 23 to detect the output voltage VSYS and a second voltage detection device 27 to detect the battery voltage VBAT. However, the first voltage detection device 23 and the second voltage detection device 27 can be omitted if the operation circuit 22 is capable of processing the output voltage VSYS and the battery voltage VBAT directly.

The operation circuit 22 can determine whether to operate under a charging mode (i.e., performing a boost power conversion and supplying power to the output terminal SYS from the external power source connected to the input terminal BUS) or a power supply mode (i.e., performing a buck power conversion and supplying power from the battery BAT to the external circuit connected to the input terminal BUS) according to for example a mode control signal MC. The mode control signal MC can be generated in various ways. For example, it can be inputted from an external circuit, inputted by a user, or determined according to an operation characteristic of the input terminal BUS. An example of the latter is thus. A determination can be made as to whether the input terminal BUS is sinking or sourcing current. If the input terminal BUS is sinking current, it is determined that the input terminal BUS is coupled to an external circuit; if the input terminal BUS is sourcing current, it is determined that the input terminal BUS is coupled to an external power source. Different types of terminals have their corresponding industrial specifications, and a determination of sinking or sourcing current can be made accordingly. Or, it is also practicable to switch the buck/boost mode by external control.

The power path management circuit 25 has one end electrically connected to the output terminal SYS and another end electrically connected to the battery BAT. The power path management circuit 25 includes a power path switch S1 and a power path controller 251, wherein the power path switch S1 is electrically connected between the output terminal SYS and the battery BAT. When the input terminal BUS of this embodiment receives power from the external power source, such power supplied from the external power source can charge the battery BAT through the boost conversion operation of the power stage 21, and the power path controller 251 can control the power path switch S1, so that the charging current ICHG flowing through the power path switch S1 is under control.

Figure 3A:
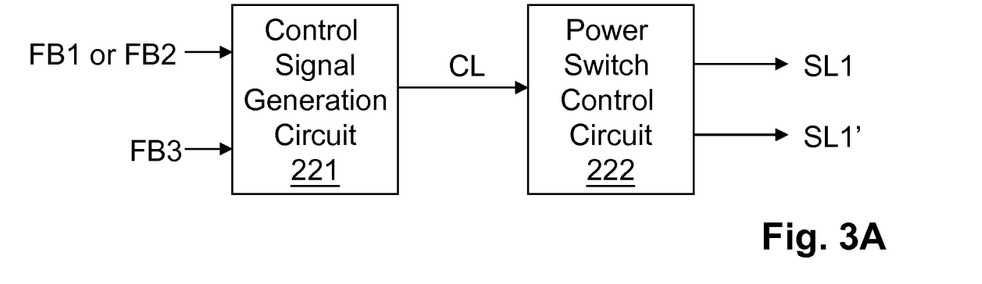
FIGS. 3A-3B show an embodiment of the operation circuit of the present invention.
Figure 3B:
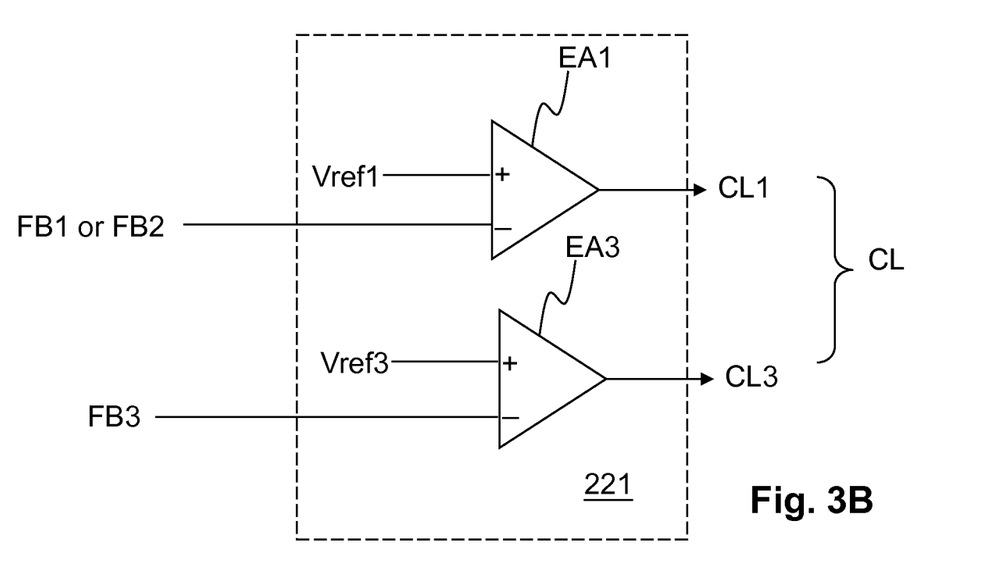

Referring to FIGS. 3A-3B, which show an embodiment of the operation circuit 22 of the present invention. As shown in FIG. 3A, the operation circuit 22 includes a control signal generation circuit 221 and a power switch control circuit 222. The control signal generation circuit 221 generates a control signal CL according to a feedback signal FB1 (which represents information related to the output voltage VSYS) or a feedback signal FB2 (which represents information related to the battery voltage VBAT), and a feedback signal FB3 (which represents information related to the charging current ICHG). The power switch control circuit 222 generates the operation signals SL1 and SL1' according to the control signal CL, to control the operations (the ON/OFF states) of the upper-gate switch S2 and the lower-gate switch S3.

FIG. 3B shows an embodiment of the control signal generation circuit 221 of the present invention. The control signal generation circuit 221 comprises an error amplifier EA1 and an error amplifier EA3. The error amplifier EA1 compares the feedback signal FB1 or FB2 with a reference signal Vref1 to generate the control signal CL1. The error amplifier EA3 compares the feedback signal FB3 with a reference signal Vref3 to generate the control signal CL3. The control signal CL comprises the control signal CL1 and the control signal CL3. The power switch control circuit 222 generates the operation signals SL1 and SL1' according to the control signal CL. There are many ways for the power switch control circuit 222 to generate the operation signals SL1 and SL1', which are well known to those skilled in the art and are not redundantly described here. For example, the power switch control circuit 222 can compare the operation signal SL1 with a saw-tooth wave signal to generate a PWM signal having a fixed frequency or a variable frequency signal having a fixed pulse width. When the control signal CL3 indicates that charging current ICHG is insufficient, the power switch control circuit 222 can increase the duty ratio of the PWM signal having the fixed frequency, or increase the frequency of the variable frequency signal having the fixed pulse width. Through feedback control loop, the regulator can regulate the output voltage VSYS or the battery voltage VBAT to the desired level (which corresponds to the reference signal Vref1) and regulate the charging current ICHG to the desired level (which corresponds to the reference signal Vref3).

Figure 3C:
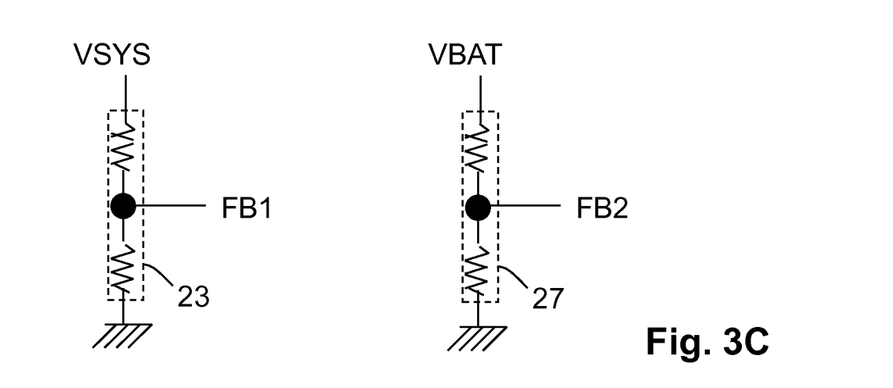
FIG. 3C shows an embodiment of the first voltage detection device and an embodiment of the second voltage detection device of the present invention.

FIG. 3C shows an embodiment of the first voltage detection device 23 and an embodiment of the second voltage detection device 27 of the present invention. The first voltage detection device 23 and the second voltage detection device 27 can be, for example, a voltage divider circuit including two resistors connected to each other in series. The feedback signals FB1 and FB2 are extracted from the voltage difference across one of the resistors.

Figure 4:
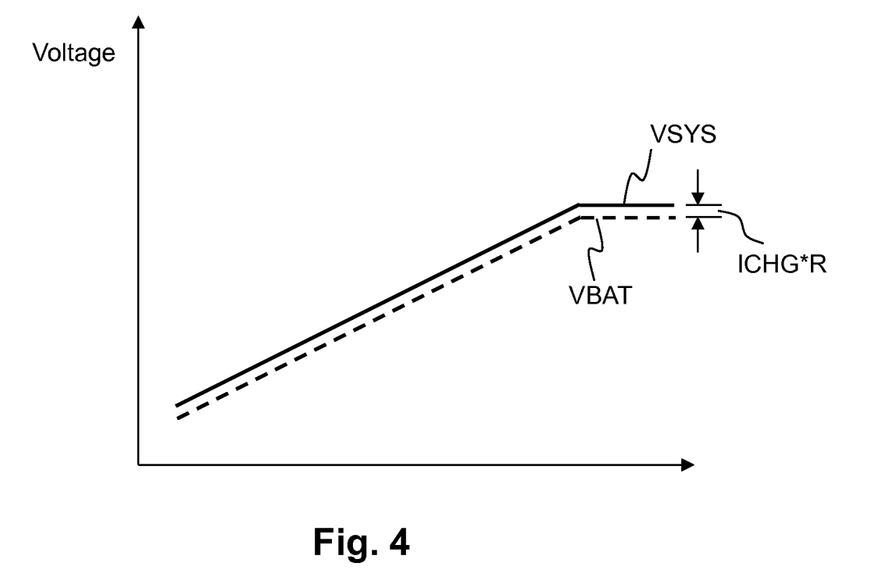
FIG. 4 shows a diagram illustrating a relationship between the output voltage VSYS and the battery voltage VBAT.

Please refer to FIG. 3B in conjugation with FIG. 4. FIG. 4 shows a diagram illustrating a relationship between the output voltage VSYS and the battery voltage VBAT. In this embodiment, the power path controller 251 controls the power path switch S1 so that the power path switch S1 is fully conductive, whereas the conduction resistance of the power path switch S1 is at its lowest value. And, the output voltage VSYS is determined by the sum of ICHG*R plus the battery voltage VBAT of the battery BAT (as shown by the solid line and the dashed line in FIG. 4), wherein ICHG represents the charging current ICHG flowing through the power path switch S1 and R represents the conductive resistance of the power path switch S1 at its fully conductive state. Because the voltage drop between the output voltage VSYS and the battery voltage VBAT is a lowest value, the power consumption is well controlled.

Note that when the power path switch S1 is fully conductive and when the charging current ICHG is regulated to a desired level, the voltage difference between the output voltage VSYS and the battery voltage VBAT is under control. Therefore, the regulator can achieve feedback control according to any one of the output voltage VSYS and the battery voltage VBAT, and either way can control both the output voltage VSYS and the battery voltage VBAT to the corresponding desired levels. This is why the foregoing paragraphs describe that the error amplifier EA1 can compare anyone of the feedback signal FB1 and the feedback signal FB2 with the reference signal Vref1 to generate the control signal CL1.

Figure 5:
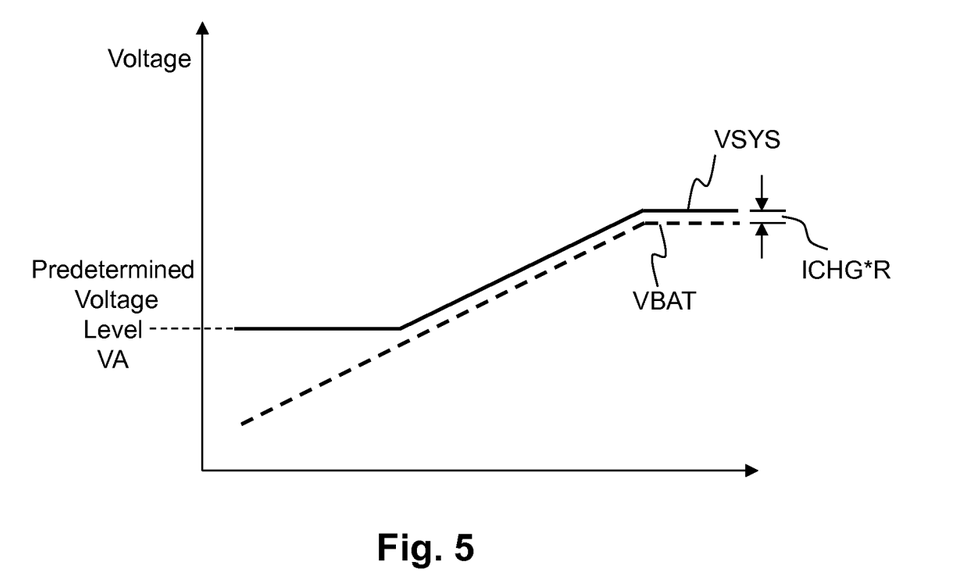
FIG. 5 shows a diagram illustrating relationships among the output voltage VSYS, the battery voltage VBAT and the predetermined voltage level VA.
Figure 6:
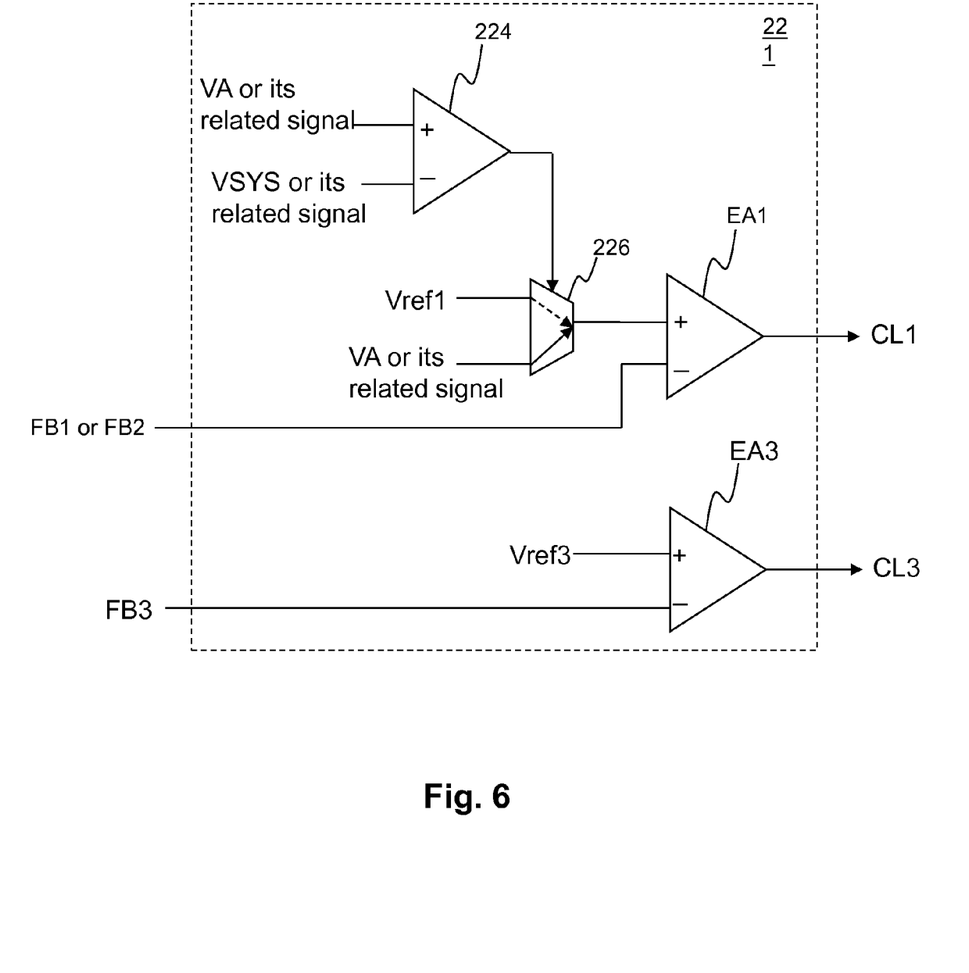
FIG. 6 shows another embodiment of the operation circuit of the present invention.

FIG. 5 shows a diagram illustrating relationships among the output voltage VSYS, the battery voltage VBAT and a predetermined voltage level VA. In this embodiment, preferably, the output voltage VSYS is not lower than the predetermined voltage level VA, so that the system load (as shown in FIG. 2) is ensured to operate properly. Under such circumstance, in the embodiment as shown in FIG. 6, the control signal generation circuit 221 can further comprise a comparator 224 and a multiplexer 226. The comparator 224 judges the relationship between the output voltage VSYS and the predetermined voltage level VA. One input terminal of the comparator 224 receives the output voltage VSYS or its related signal and the other input terminal of the comparator 224 receives the predetermined voltage level VA or its related signal. If one input terminal of the comparator 224 receives the output voltage VSYS, the other input terminal of the comparator 224 receives the predetermined voltage level VA. If one input terminal of the comparator 224 receives a signal related to the output voltage VYS (e.g., the feedback signal FB1), according to the ratio of the feedback signal FB1 to the output voltage VSYS (i.e., FB1/VSYS), the predetermined voltage level VA should be multiplied by the same ratio and then inputted into the other input terminal of the comparator 224. When the output voltage VSYS is lower than the predetermined voltage level VA, the multiplexer 226 selects the predetermined voltage level VA (or its related signal), and the error amplifier EA1 will compare the feedback signal FB1 or the feedback signal FB2 with the predetermined voltage level VA (or its related signal). Through the feedback control loop, the output voltage VSYS can be regulated to the predetermined voltage level VA (if what the error amplifier EA1 receives is the feedback signal FB2, the value of the predetermined voltage level VA or its related signal can be correspondingly adjusted so that the voltage difference ICHG*R between the output voltage VSYS and the battery voltage can be filled up). When the output voltage VSYS is not lower than the predetermined voltage level VA, the multiplexer 226 selects the reference signal Vref1, and the error amplifier EA1 will compare the feedback signal FB1 or the feedback signal FB2 with the reference signal Vref1, which operates according to substantially the same mechanism as FIG. 3B and FIG. 4.

Figure 7:
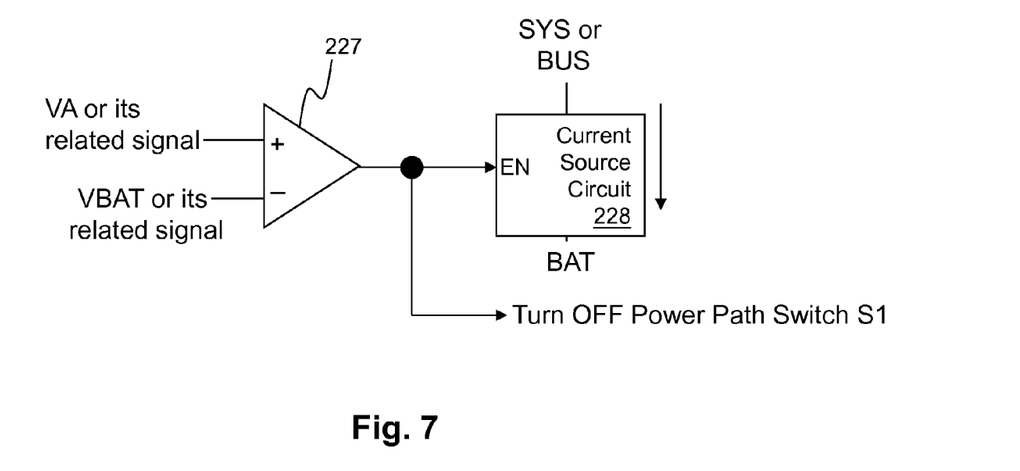
FIGS. 7-8 are diagrams illustrating embodiments of control methods when the battery voltage VBAT is lower than the predetermined voltage level VA.

Please refer again to FIG. 5. When the output voltage VSYS is kept at the predetermined voltage level VA and when the battery voltage VBAT is lower than the predetermined voltage level VA, because the voltage difference between the output voltage VSYS and the battery voltage VBAT is not equal to ICHG*R, this voltage difference can therefore not be controlled by fully turning ON the power path switch S1 and regulating the charging current ICHG to a desired level. Under such circumstance, referring to FIG. 7, in one embodiment, the bi-directional switching regulator 20 can further comprise a comparator 227 and a current source circuit 228 (the comparator 227 and the current source circuit 228 can be provided inside the operation circuit 22 or they can be independent circuits outside the operation circuit 22). The comparator 227 judges the relationship between the battery voltage VBAT and the predetermined voltage level VA. One input terminal of the comparator 227 receives the battery voltage VBAT or its related signal and the other input terminal of the comparator 227 receives the predetermined voltage level VA or its related signal. When the battery voltage VBAT is lower than the predetermined voltage level VA, the output of the comparator 227 can turn OFF the power path switch S1 (so that the voltage difference between the output voltage VSYS and the battery voltage VBAT is not affected by the voltage drop of the power path switch S1). Besides, optionally, the current source circuit 228 can be turned ON (e.g., the output of the comparator 227 can be sent to an enable terminal EN of the current source circuit 228), so that the battery BAT can be charged through another path. The current source circuit 228 can supply current for example from the output terminal SYS or the input terminal BUS to the battery BAT. When the battery voltage VBAT is higher than the predetermined voltage level VA, the circuit operates according to substantially the same mechanism as FIG. 3B and FIG. 4. In another embodiment, when the battery voltage VBAT is lower than the predetermined voltage level VA, the regulator can simply turn OFF the power path switch S1 and does not charge the battery BAT through another path.

Figure 8:
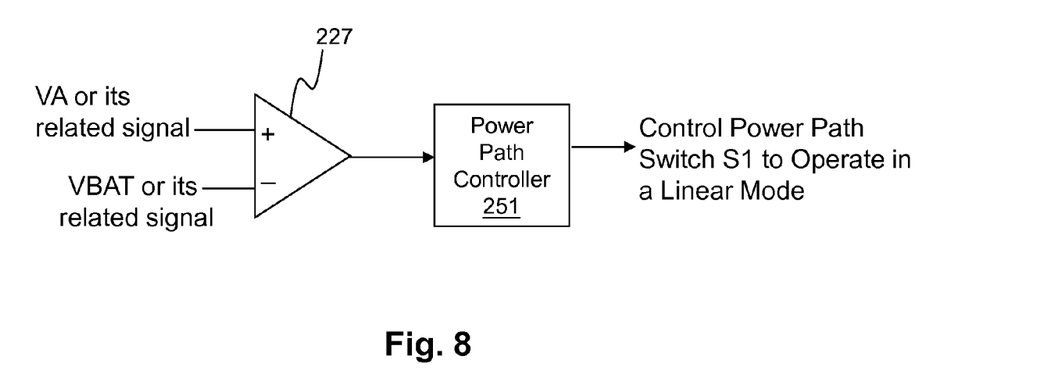

Please refer to FIG. 8. In another embodiment, the bi-directional switching regulator 20 can further comprise a comparator 227 (the comparator 227 can be provided inside the operation circuit 22 or it can be an independent circuit outside the operation circuit 22). Similar to the embodiment shown in FIG. 7, the comparator 227 judges the relationship between the battery voltage VBAT and the predetermined voltage level VA. One input terminal of the comparator 227 receives the battery voltage VBAT or its related signal and the other input terminal of the comparator 227 receives the predetermined voltage level VA or its related signal. When the battery voltage VBAT is lower than the predetermined voltage level VA, the output of the comparator 227 can be transmitted to the power path controller 251. The power path controller 251 then controls the power path switch S1 to operate in a linear mode, that is, the power path switch S1 which is a MOS transistor operates in its linear region. When the power path switch S1 operates in the linear mode, the voltage difference between the output voltage VSYS and the battery voltage VBAT is not equal to ICHG*R, so the output voltage VSYS will not be affected by the level of the battery voltage VBAT even though the level of the battery voltage VBAT may be very low. When the battery voltage VBAT is higher than the predetermined voltage level VA, the regulator operates according to substantially the same mechanism as FIG. 3B and FIG. 4.

Figure 9:
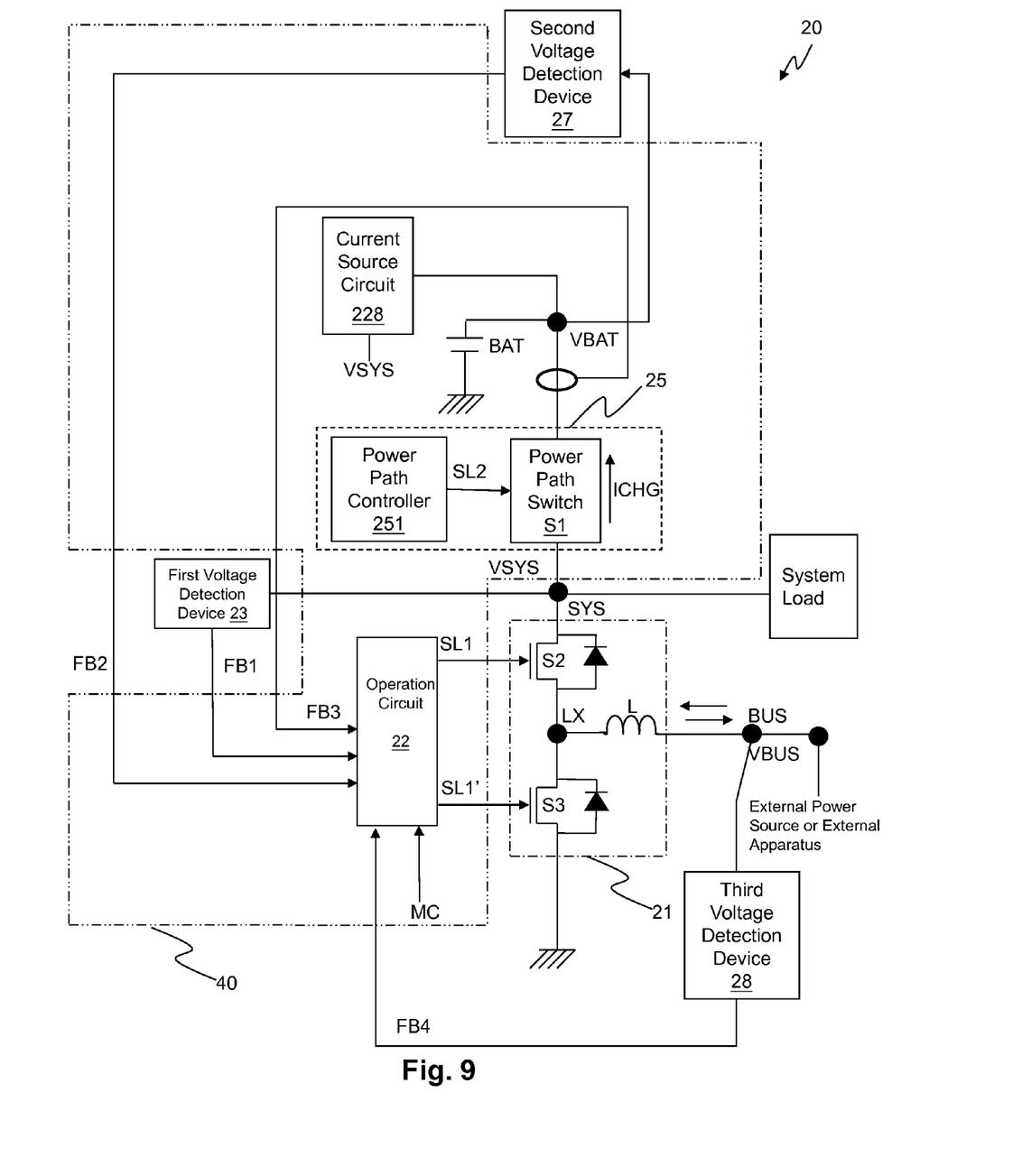
FIG. 9 shows a schematic diagram of a bi-directional switching regulator according to another embodiment of the present invention.

Please refer to FIG. 9. When the bi-directional switching regulator 20 is required to supply power from the battery voltage VBAT to the external apparatus connected to the input terminal BUS, the regulator can further comprise a third voltage detection device 28, to achieve feedback control. The voltage information of the input terminal BUS is detected by the third voltage detection device 28 and transmitted to the operation circuit 22. However, the third voltage detection device 28 can be omitted if the operation circuit 22 is capable of processing the input voltage VBUS directly.

In one embodiment, the operation circuit 22, the power path management circuit 25 and the current source circuit 228 can be all or partially integrated into a control circuit 40 as an integrated circuit by a semiconductor manufacturing process.

Figure 10A:
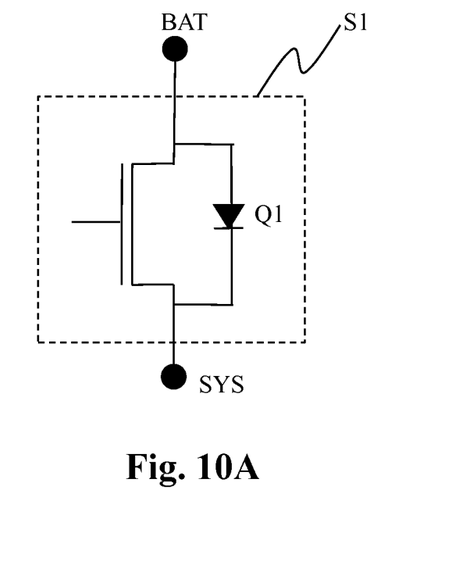
FIGS. 10A-10D show several embodiments of the power path switch.
Figure 10B:
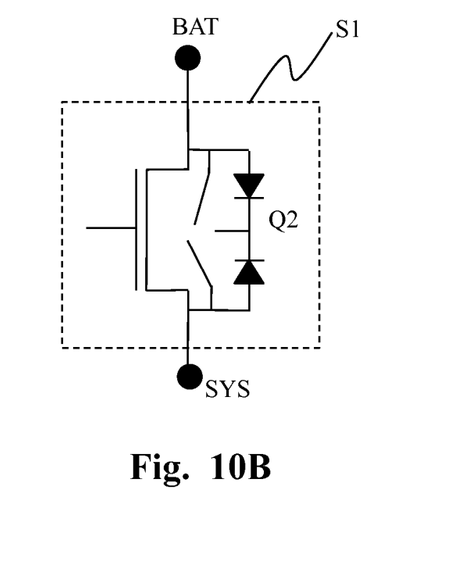
Figure 10C:
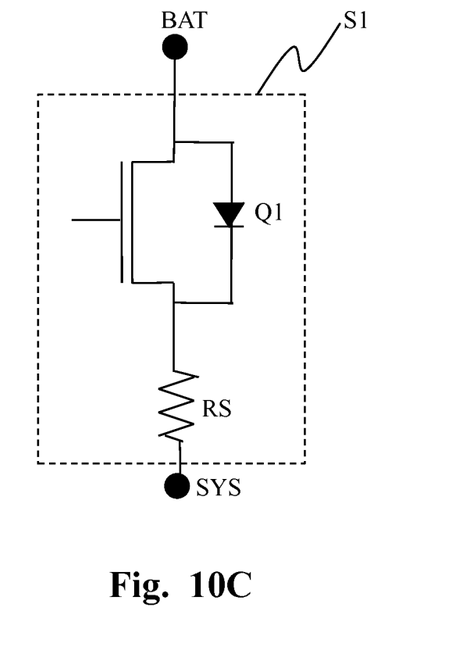
Figure 10D:
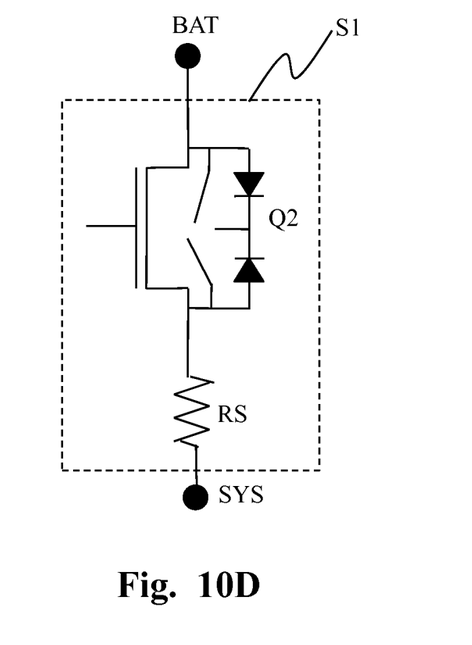

Please refer to FIGS. 10A-10D, which show several embodiments of the power path switch. The power path switch S1 includes a transistor Q1 (as shown in FIG. 10A) or a transistor Q2 whose parasitic diode polarity is adjustable (as shown in FIG. 10B). In addition, the power path switch S1 can further include a resistor which is coupled to the transistor Q1 (as shown in FIG. 10C) or the transistor Q2 whose parasitic diode polarity is adjustable (as shown in FIG. 10D). In the embodiment shown in FIGS. 10A and 10C, the parasitic diode of the transistor Q1 has its anode electrically connected to the battery BAT and its cathode electrically connected to the output terminal SYS. Accordingly, when the output voltage VSYS at the output terminal SYS is higher than the battery voltage VBAT of the battery BAT, anode-cathode direction of the parasitic diode of the transistor Q1 is opposite to the current direction from the output terminal SYS to the battery BAT (so that the current can be controlled by the channel of the transistor). Or, for another example, as shown in FIGS. 10B and 10D, the parasitic diode of the transistor Q2 has a polarity which is adjustable. Therefore, when the output voltage VSYS at the output terminal SYS is higher than the battery voltage VBAT of the battery BAT, the anode-cathode direction of the parasitic diode can be set to be opposite to the direction of the current from the output terminal SYS to the battery BAT. And when the output voltage VSYS at the output terminal SYS is lower than the battery voltage VBAT of the battery BAT, to prevent a current from flowing from the battery BAT toward the output terminal SYS (e.g., when it is desired to stop operating the bi-directional switching regulator 20), the anode-cathode direction of the parasitic diode can be set to be opposite to the direction from the battery BAT toward the output terminal SYS. Thus, the power path switch S1 can protect the battery BAT and control the current.

Figure 11:
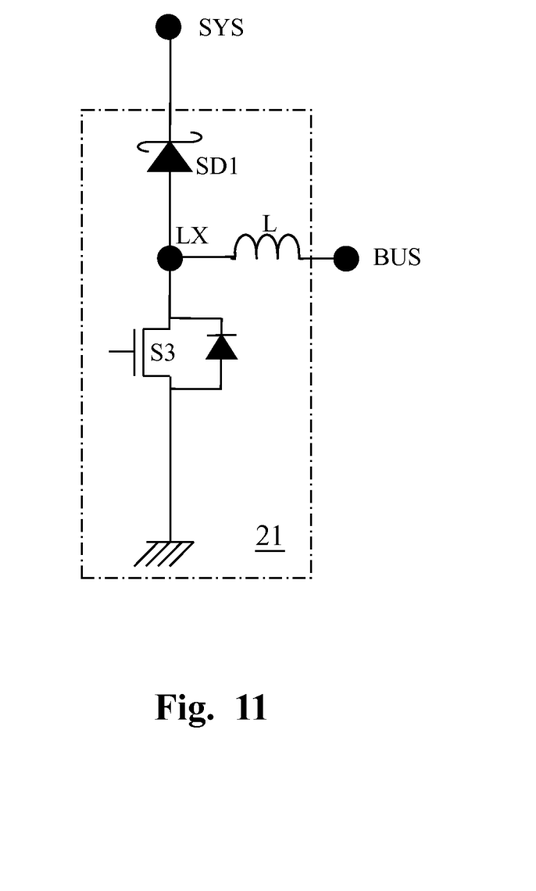
FIG. 11 shows another embodiment of the power stage when the power stage operates under a boost conversion operation.

Please refer to FIG. 11. When the bi-directional switching regulator 20 is simply required to perform a boost power conversion (unidirectional operation) instead of a buck/boost power conversion (bi-directional operation), in one embodiment, the upper-gate switch S2 can be replaced by a Schottky diode SD1, as shown in FIG. 11.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, a device which does not substantially influence the primary function of a signal can be inserted between any two devices in the shown embodiments, such as a switch. For another example, the power path switch S1, the upper-gate switch S2 and the lower-gate switch S3 can be a PMOS transistor or an NMOS transistor. For another example, the positive and negative input terminals of an error amplifier circuit or a comparator are interchangeable, with corresponding amendments of the circuits processing these signals. In view of the foregoing, the spirit of the present invention should cover all such and other modifications and variations, which should be interpreted to fall within the scope of the following claims and their equivalents.

What is claimed is:

1. A bi-directional switching regulator for use under a charging mode to convert an input voltage supplied by an input terminal to an output voltage at an output terminal, or for use under a discharging mode to supply power from the output terminal to the input terminal, the switching regulator comprising:
   a power stage coupled between the input terminal and the output terminal;
   an operation circuit for generating an operation signal to control an operation of the power stage, the operation circuit determining whether to operate under the charging mode or the discharging mode according to a mode control signal,
   wherein the operation circuit includes:
      a control signal generation circuit for generating a control signal according to (a) information related to the output voltage and information related to the charging current, or (b) information related to the battery voltage and information related to the charging current; and
      a power switch control circuit for generating the operation signal according to the control signal; and
   a power path management circuit having one end electrically connected to the output terminal and another end electrically connected to a battery, for controlling a charging operation from the output terminal to the battery, the power path management circuit including:
      a power path switch electrically connected between the output terminal and the battery; and
      a power path controller for controlling the power path switch, so that the charging current is controlled;
   wherein the operation circuit generates the operation signal according to information related to the output voltage or information related to a battery voltage of the battery, and information related to the charging current, so that:
      (1) a voltage difference between the output voltage and the battery voltage is under control, and the voltage difference is ICHG*R, wherein ICHG represents the charging current and R represents a conduction resistance when the power path switch is fully conductive; or
      (2) the output voltage is determined by a higher one of a predetermined voltage level and the sum of ICHG*R plus the battery voltage.

2. The bi-directional switching regulator of claim 1, wherein when the output voltage is determined by the predetermined voltage level and when the battery voltage is lower than the predetermined voltage level, the power path switch is turned OFF.

3. The bi-directional switching regulator of claim 2, wherein when the power path switch is turned OFF, the bi-directional switching regulator conducts charging operation to the battery through another path.

4. The bi-directional switching regulator of claim 1, wherein when the output voltage is determined by the predetermined voltage level and when the battery voltage is lower than the predetermined voltage level, the power path controller controls the power path switch to operate in a linear mode wherein the power path switch is a MOS transistor and operates in a linear region of the MOS transistor.

5. The bi-directional switching regulator of claim 1, wherein the control signal generation circuit includes:
   a first error amplifier for comparing information related to the output voltage or information related to the battery voltage with a first reference signal; and
   a second error amplifier for comparing information related to the charging current with a second reference signal.

6. The bi-directional switching regulator of claim 1, wherein the control signal generation circuit includes:
   a first error amplifier for comparing information related to the output voltage or information related to the battery voltage with a first reference signal or information related to the predetermined voltage level;
   a second error amplifier for comparing information related to the charging current with a second reference signal;
   a comparator for judging a relationship between the output voltage and the predetermined voltage level; and
   a multiplexer for selecting and providing the first reference signal or information related to the predetermined voltage level to the first error amplifier according to a judgment result of the comparator.

7. The bi-directional switching regulator of claim 1, further comprising:
   a comparator for judging a relationship between the battery voltage and the predetermined voltage level.

8. A control circuit of a bi-directional switching regulator, for controlling a power stage under a charging mode to convert an input voltage supplied by an input terminal to an output voltage at an output terminal, or under a discharging mode to supply power from the output terminal to the input terminal, the control circuit comprising:

an operation circuit for generating an operation signal to control an operation of the power stage, the operation circuit determining whether to operate under the charging mode or the discharging mode according to a mode control signal, wherein the operation circuit includes:

a control signal generation circuit for generating a control signal according to (a) information related to the output voltage and information related to the charging current, or (b) information related to the battery voltage and information related to the charging current; and a power switch control circuit for generating the operation signal according to the control signal; and a power path management circuit having one end electrically connected to the output terminal and another end electrically connected to a battery, for controlling a charging operation from the output terminal to the battery, the power path management circuit including:

a power path switch electrically connected between the output terminal and the battery; and a power path controller for controlling the power path switch, so that the charging current is controlled;

wherein the operation circuit generates the operation signal according to information related to the output voltage or information related to a battery voltage of the battery, and information related to the charging current, so that:

(1) a voltage difference between the output voltage and the battery voltage is under control, and the voltage difference is ICHG*R, wherein ICHG represents the charging current and R represents a conduction resistance when the power path switch is fully conductive; or (2) the output voltage is determined by a higher one of a predetermined voltage level and the sum of ICHG*R plus the battery voltage.

9. The control circuit of claim 8, wherein when the output voltage is determined by the predetermined voltage level and when the battery voltage is lower than the predetermined voltage level, the power path switch is turned OFF.

10. The control circuit of claim 9, wherein when the power path switch is turned OFF, the bi-directional switching regulator conducts charging operation to the battery through another path.

11. The control circuit of claim 8, wherein when the output voltage is determined by the predetermined voltage level and when the battery voltage is lower than the predetermined voltage level, the power path controller controls the power path switch to operate in a linear mode wherein the power path switch is a MOS transistor and operates in a linear region of the MOS transistor.

12. The control circuit of claim 8, wherein the control signal generation circuit includes:

a first error amplifier for comparing information related to the output voltage or information related to the battery voltage with a first reference signal; and a second error amplifier for comparing information related to the charging current with a second reference signal.

13. The control circuit of claim 8, wherein the control signal generation circuit includes:

a first error amplifier for comparing information related to the output voltage or information related to the battery voltage with a first reference signal or information related to the predetermined voltage level;

a second error amplifier for comparing information related to the charging current with a second reference signal;

a comparator for judging a relationship between the output voltage and the predetermined voltage level; and a multiplexer for selecting and providing the first reference signal or information related to the predetermined voltage level to the first error amplifier according to a judgment result of the comparator.

14. The control circuit of claim 8, further comprising:

a comparator for judging a relationship between the battery voltage and the predetermined voltage level.

* * * * *